July 22, 1958    A. J. STOCK    2,843,927
METHOD OF MANUFACTURE OF GEAR TEETH
Filed March 3, 1955

INVENTOR
*Arthur J. Stock*
BY *Stevens, Davis, Miller & Mosher*
ATTORNEYS

United States Patent Office 2,843,927
Patented July 22, 1958

2,843,927

METHOD OF MANUFACTURE OF GEAR TEETH

Arthur J. Stock, Cleveland, Ohio

Application March 3, 1955, Serial No. 491,833

4 Claims. (Cl. 29—545)

This invention relates generally to manufacturing and, more particularly, to a new and novel method of producing a rack.

Generally, as is well known by those skilled in the art, a rack tooth has a flat contact surface which is obliquely disposed with respect to the transverse center line of the tooth.

This angularity is defined as the pressure angle, and for optimum results, it is necessary for the teeth of a rack to possess the same pressure angle as the pinion gears with which they mesh. While in practice, a 14.5° pressure angle has been most commonly used, a 20° pressure angle has been found suitable in certain special applications.

In order for a rack which meshes with an involute type pinion gear to move with the desired uniform velocity when actuated, it is necessary that the rack teeth have a flat contact surface, the same pressure angle as the drive-pinions, and a tooth height substantially equivalent to the height of the pinion teeth. In the event that the pressure angle of a rack is incorrect, the tooth profile inaccurate, or the height of the rack teeth insufficient, the advance of the rack will be jerky and the velocity will be decidedly non-linear. Furthermore, the operation of such a rack will be characterized at any reasonable velocity by low power transmission efficiency, and the system will be incapable of carrying the optimum load.

In the past, prior art methods of fabricating a rack from flat stock have not been completely successful. Often, failure to provide the proper tooth form has resulted in a construction which was suitable only for light loads and lower speeds, and which functioned at low efficiency. In other cases, failure to provide the correct pressure angle has resulted in a tendency for the rack and pinion teeth to stick or bind, and has resulted in erratic non-linear drives. In still other cases, attempts to utilize a rack tooth of less than the required minimum height have contributed to a non-uniform rate of actuation and generally unsatisfactory performance.

The present invention contemplates an economical and practical method of fabricating a rack section which will substantially eliminate the deficiencies of the prior art structures.

Accordingly, therefore, a primary object of this invention is to provide a quick and inexpensive method of manufacturing a rack which is characterized by the correct tooth profile and pressure angle.

Another object of this invention is to provide a rack without a bottom or root section between the teeth, so that the rack can be readily used in a dirty atmosphere without the accumulation of dust or other foreign material becoming jammed between the top of the pinion teeth and the root of the rack teeth.

Another object of this invention is to provide a rack tooth which is cold-worked so as to provide a good grain structure in the metal.

Another object of this invention is to provide a method of producing a degree of accuracy in a rack which will give a smoothly operating rack and pinion drive.

Still another object of this invention is to provide a method of producing racks with a pressure angle and a tooth profile which will permit the rack to move with smooth, uniform velocity.

A further object of the invention is to teach a practical and economical method of fabricating from flat stock a rack which will possess the correct tooth profile and pressure angle for deriving optimum torque from a meshing pinion.

A further object of the present invention is to provide a method of manufacturing a rack by punching a series of tapered openings at the approximate pressure angle followed by coining to smooth up the contact face and improve the accuracy.

A further object of this invention is to teach a method of making a rack tooth by punching tapered holes to form substantially a complete tooth profile, and providing by coining a work-hardened tooth face to provide a good grain structure in the metal.

A still further object of this invention is to teach a new and novel method of fabricating an economical and efficient gear.

Other and further objects and advantages of the present invention will become apparent from the following detailed description in the invention, taken in conjunction with the appended drawings, which form a part of this specification, and in which.

Figure 3:
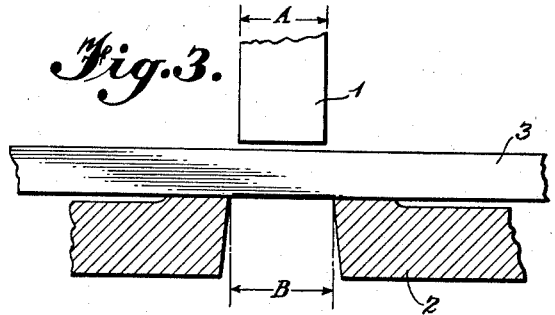
Figure 3 illustrates the method of punching the tapered holes in a workpiece, to form the space between the rack teeth.

Turning now to the drawings, and more particularly to Figure 3, there is illustrated the apparatus which is used to perform the first step in the method. In general, Figure 3 illustrates a typical punching operation which can be accomplished by any conventional type of punch press. This first step comprises the punching of a series of holes in the work piece 3. While holes of rectangular shape are shown, it will be appreciated that the invention is by no means restricted thereto. As will be explained more fully below, these holes will be larger on one side than on the other, so that the approximate pressure angle of the finished teeth is readily obtained with a minimum of metal deformation in the later steps of the process. In Figure 3, there is shown a punch, or male member 1. Below the punch there is located the female member, or die, 2 and a work piece 3 is shown as being slidably interposed between the punch 1 and the die 2. Punch 1 is given a dimension A substantially as shown in Figure 3 and is adapted to penetrate an aperture in the female member 2 characterized by the dimension B. The dimension B of the die is deliberately made larger than the corresponding dimension A of the punch, so that when the punch 1 is actuated and effectively shears metal from the work piece 3 prior to penetrating the die 2, the walls of the resultant hole will be tapered. After one or more rectangular holes are punched, workpiece 3 is reciprocated to either the left or right, depending on the desired direction of feed, and the operation is repeated. In this manner, a plurality of serially disposed holes may be punched in the work piece 3. It will be appreciated that a suitable feed mechanism may be employed to reciprocate the workpiece as required.

Figure 4:
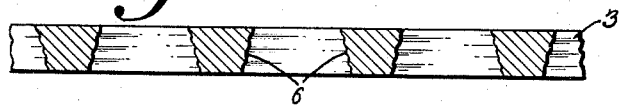
Figure 4 illustrates a section through the workpiece after the punching operation shown in Figure 3.

Continuing now with the detailed description, in Figure 4 there is shown a longitudinal cross section of the work piece 3 after several holes have been punched therethrough. The tapered surfaces 6 of the rectangular holes are clearly evident in Figure 4, and are caused by the disparity between the dimension A of the punch 1 and the dimension B of the die 2, as earlier explained. The working surfaces of the rack, as shown in Figure 4, will be shaped almost to the desired pressure angle and tooth profile but will only approximate the final dimensions. As will be explained more fully below, the punching operation is also usable in shaping the blank for making involute gears.

Figure 5:
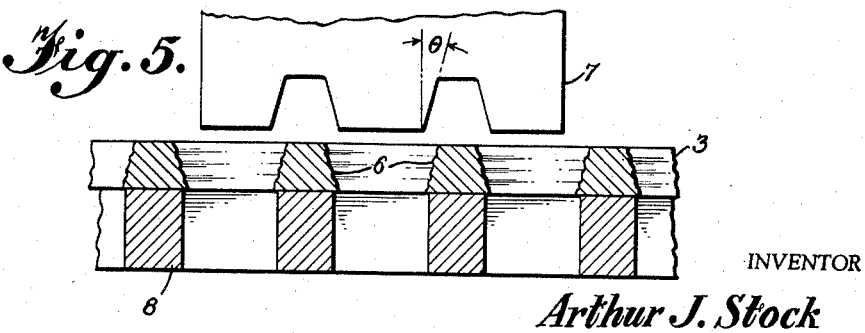
Figure 5 illustrates the method of coining the teeth of the rack after the tapered holes have been punched therethrough, in order to provide the proper shape and pressure angle.

In Figure 5 there is illustrated a coining die 7, which is utilized in obtaining precisely the correct tooth profile and pressure angle for the rack teeth. A suitable press is provided for actuating the die 7. The work piece 3, which is now provided with rectangular holes provided with the tapered wall sections, is turned over and interposed between the coining die 7 and the anvil 8. On the downward stroke, the press squeezes the rack between the coining die and forces the workpiece 3 to assume the precise profile of the coining die 7. The anvil itself may comprise either a flat solid plate or a structure as shown, which is relieved to allow the coining die to project into the anvil slightly. The coining die 7 may comprise either a plurality of tooth sections, as shown or a single tooth section adapted to coin one rack tooth at a time. Each of the wall sections of the teeth of the die 7 is provided with an angularity $\theta$. It will be appreciated that the angle $\theta$ will control the pressure angle which is supplied to the completed rack. The pressure angle $\theta$ may be set at 14.5°, at 20°, or at any other convenient value which will provide a rack having the same pressure angle as its meshing pinion gear.

Additionally, an involute gear profile may be provided to enable the fabricating of circular gear members by the method of this invention. When this is done, the die 7 is used to coin the tapered wall section to an involute form. Then, the strip of flat stock may be applied to a cylindrical blank of suitable dimensions by any convenient means to provide a rugged and economical gear.

In employing the method of manufacturing taught in this invention, it is contemplated that either single or multiple punches can be used to punch the tapered holes. Also, either single or multiple-tooth coining dies may be employed in forming the teeth after the punching operation.

While most racks fabricated according to the method of this invention will be of steel, it is contemplated that the method is equally adaptable to use in connection with any metal or plastic or other suitable material having a reasonable amount of ductility.

In general, it has been found that rack teeth fabricated according to the method of this specification are straighter if the coining die 7 straddles each tooth rather than attempting to finish adjacent sides of two teeth at the same time with the opposite sides thereof unsupported. Furthermore, greater accuracy is obtained if a group of the teeth are coined simultaneously rather than being coined individually. It will be obvious to those skilled in the art that the capacity of the available coining press and the number of pieces to be made will determine the advisability of coining the teeth several teeth at a time, one at a time, or all together.

Figure 1:
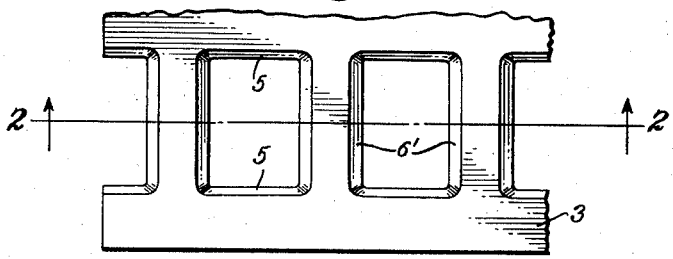
Figure 1 shows a fragmentary plan view of a rack, showing three teeth made by the method of this specification.
Figure 2:
Figure 2 is a longitudinal section view taken along the line 2—2 in Figure 1 and looking in the direction of the arrows.

The lengthwise portions of the hole, as shown by the numeral 5 in Figure 1, may be also coined merely by proper proportioning of the coining die 7. Alternatively, the coining operation may be restricted solely to the contact surfaces which engage the mating pinion, and the lengthwise sides 5 may be made straight or tapered as desired. The exact shape and finish of longitudinal surfaces 5 is less critical than that of the surfaces 6 because of the fact that they do not contact the operating pinion. As earlier mentioned in this specification, the surfaces 6 are the contact surfaces of the rack teeth and these are coined in order to give the correct tooth profile and pressure angle.

While racks formed by the method of this invention are by no means limited thereto, they have been found to be of unusual utility when used in dust laden atmospheres, and it has been found that easy operation of the racks and pinion results because there is no possibility for the accumulation of foreign material between the tops of the pinions and the roots of the racks.

Therefore, while I have illustrated and described a practical and efficient form of embodiment of my invention suitable for the proposed uses, it will be understood that certain changes, alterations, modifications and substitutions can be made without departing from the spirit and scope of the appended claims.

I claim as my invention:

1. A method of making a mechanical component having a plurality of flat-sided teeth of predetermined spacing and pressure angle which includes the steps of feeding stock of uniform thickness through a press provided with a male punch having a preselected width and a female die having a width greater than that of said punch, actuating said press to cause said punch to penetrate said stock and enter said female die whereby said punch effectively shears separate wedge-shaped portions out of said stock prior to entry into said female die to produce rough-tapered walls in the penetrated sections of said stock, feeding said stock through a coining die provided with a male member having teeth of predetermined pressure angle and spacing and an anvil to support said punched stock, and coining said punched stock between the male member and the anvil of said coining die to cause cold plastic flow of the rough-tapered walls of said punched stock to produce a work-hardened mechanical component with a plurality of smooth flat-sided teeth of good grain structure having a spacing and pressure angle exactly conforming to the form of said coining die.

2. The method recited in claim 1 wherein the coining step involves the simultaneous coining of a plurality of rough-tapered teeth to produce said plurality of smooth flat-sided teeth.

3. A method of making a mechanical component having a plurality of gear teeth of predetermined spacing and pressure angle which includes the steps of feeding stock of substantially uniform thickness through a press provided with a male punch having a preselected width and a female die having a width greater than that of said punch, successively actuating said press to cause said punch to move toward said female die so as to penetrate said stock, whereby said punch effectively shears separate wedge-shaped portions out of said stock thereby producing resulting rough-tapered teeth in the portions of said stock between the punched-out portions thereof, feeding said stock through a coining die provided with a male member having teeth of predetermined pressure angle and spacing and an anvil to support said punched stock, and coining said rough-tapered teeth between the male member and the anvil of said coining die to produce a work-hardened mechanical component with a plurality of smooth gear teeth of good grain structure having a spacing, pressure angle and profile conforming to the form of said coining die.

4. A method of making a mechanical component having a plurality of gear teeth of predetermined spacing and pressure angle which includes the steps of feeding stock of substantially uniform thickness through a press provided with a plurality of male punches having a preselected width and spacing and a female die having a plurality of openings, each of said openings being positioned opposite a corresponding male punch and being greater in width than that of said corresponding punch, actuating said press to cause said punches to move toward said female die openings so as to penetrate said stock, whereby said punches effectively shear separate wedge-shaped portions out of said stock so as to produce resulting rough-tapered teeth in the portions of said stock between the punched-out portions thereof, feeding said stock through a coining die provided with a plurality of male members having teeth of predetermined pressure angle and spacing and an anvil to support said punched stock, and simultaneously coining a plurality of said rough-tapered teeth to produce a work-hardened mechanical component with a plurality of smooth gear teeth of good grain structure having a spacing, pressure angle and profile exactly conforming to the form of said coining die.

References Cited in the file of this patent

UNITED STATES PATENTS

| | | |
|---|---|---|
| 1,625,131 | Miller | Aug. 19, 1927 |
| 1,650,055 | Tregillus | Nov. 22, 1927 |
| 1,990,718 | Swanstrom | Feb. 12, 1935 |
| 2,051,639 | Kalmbacker | Aug. 18, 1936 |
| 2,383,584 | Beischline | Aug. 28, 1946 |
| 2,704,882 | Olson | Mar. 29, 1955 |
| 2,774,132 | Squire | Dec. 18, 1956 |